(12) United States Patent
Leisner

(10) Patent No.: US 6,227,351 B1
(45) Date of Patent: May 8, 2001

(54) TRANSPORT SYSTEM

(75) Inventor: Ernst Leisner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,041

(22) PCT Filed: Jan. 23, 1998

(86) PCT No.: PCT/DE98/00203

§ 371 Date: Jul. 22, 1999

§ 102(e) Date: Jul. 22, 1999

(87) PCT Pub. No.: WO98/34858

PCT Pub. Date: Aug. 13, 1998

(30) Foreign Application Priority Data

Feb. 6, 1997 (DE) ............................................. 197 04 441

(51) Int. Cl.⁷ .................................................. B65G 37/00

(52) U.S. Cl. ........................................ 198/571; 198/460.1

(58) Field of Search .............................. 198/460.1, 464.2, 198/571, 572, 575, 577; 29/33 P

(56) References Cited

U.S. PATENT DOCUMENTS

| 4,112,999 | * | 9/1978 | Gasper | 198/571 X |
| 5,186,308 | * | 2/1993 | Munro | 198/572 |
| 5,228,558 | * | 7/1993 | Hall | 198/571 X |
| 5,477,117 | * | 12/1995 | Saito | 198/460.1 X |
| 5,979,636 | * | 11/1999 | Vanacore et al. | 198/460.1 |

* cited by examiner

Primary Examiner—James R. Bidwell
(74) Attorney, Agent, or Firm—Michael J. Striker

(57) ABSTRACT

A transport system (10) for feeding or discharging goods to be conveyed at machining units (24) or node points (18–21) while passing through a speed profile (43) which, beginning at a basic speed ($V_1$) other than zero, assumes a different speed ($V_3$) and returns to the basic speed ($V_1$) again.

11 Claims, 3 Drawing Sheets

TRANSPORT SYSTEM

BACKGROUND OF THE INVENTION

The invention relates to a transport system. From German Patent DE 40 39 265 C2, a transport system is known in which the feeding and/or discharging of workpiece carriers at machining units is performed with the aid of a phased conveyor. The conveyor belt of the phased conveyor is divided by cams into segments in which workpiece carriers are disposed. There are workpiece carriers with unmachined or machined parts and/or component units in the segments upstream and downstream of the machining unit, respectively. The conveying is done in accordance with a speed profile that recurs once per phase. This serves to increase the throughput of workpiece carriers. A speed profile can be shown for instance in the form of a speed and travel graph or a speed and time graph. Beginning at the zero speed, the speed of the phased conveyor increases to a certain value and then returns to zero. The speed profile for the phased conveyor is generated by a frequency inverter, a braked rotary current motor, a worm gear, and a disk cam gear. With the frequency inverter, the braked rotary current motor is operated at different but in each case constant rotary speeds, or rpm. The worm gear converts the rpm of the rotary current motor into a lower driven rpm. Such a gear is required in all transport systems that use rotary current motors, since the rotary speeds of a rotary current motor are relatively high. It is the disk cam gear that for the first time converts the constant driven rpm of the worm gear into a driving rpm for the phased conveyor, and this driving rpm is directly proportional to the speed profile.

During the machining cycle, the phased conveyor is at a standstill. It conveys articles only whenever the end of machining is reached and the outlet is empty. It is always disadvantageous, however, if after the machining there are no workpiece carriers at the inlet. Either the phased conveyor conveys an empty segment, which means that in the machining unit the parts and/or component groups of a missing workpiece carrier are machined, or the phased conveyor stops because it is waiting for an unmachined machining unit. During this period, no workpiece carriers are discharged. In the workpiece carrier throughput, a gap has occurred that can no longer be made up for.

Employing the principle of the phased conveyor to the entire transport system including the main conveyor way and the feeder conveyor way and discharge conveyor way would mean that the individual machining units would no longer be connected to a flexible transfer system but would be firmly chained together. This is because in that case the workpiece carriers would be trapped between cams or within segments and could thus no longer be transported flexibly.

The length of the phased conveyor is also an integral multiple of the length of one segment, which means that the length of the phased conveyor cannot be designed to be highly variable.

In addition to the known transport system, there are still others that in order to achieve a higher workpiece carrier throughput operate at a higher conveyor way speed. This has the disadvantage, however, that workpiece carriers run up at the correspondingly higher speed against stoppers or workpiece carriers that are at a stop. Thus dampers or additional time are required to calm the workpiece carrier, and once again this causes delays.

SUMMARY OF THE INVENTION

Accordingly, it is an object of the present invention to provide a transport system which eliminates the disadvantages of the prior art.

In keeping with these objects, one feature of present invention resides, briefly stated, in a transport system which has at least one conveyor means; at least one drive mechanism assigned to each of the conveyor means and driving the later; at least one electronic control unit provided for at least one drive mechanism and generating at least one speed profile which begins at a basic value other than zero, assumes at least one other value, and then resumes the basic value, so that the at least one conveyor means constantly convey workpiece carriers, the at least one conveyor means having at least one signal transducer whose signals act on the at least one control unit, so that the speed profile is tripped when a workpiece carrier reaches the signal transducer or a position at a machining unit, or when a machining unit reports an end of machining.

When the transport system is designed in accordance with the present invention it has the advantage over the prior art that workpiece carriers can be conveyed even during machining. If there is no workpiece carrier at the inlet, a workpiece carrier with machined parts and/or component units can still be carried away. However, since as a rule a plurality of workpiece carriers are always located upstream of the machining unit, the parts and/or component units of the workpiece carriers that are present can still be machined even if no new workpiece carrier has arrived at the inlet, and the workpiece carriers can be discharged after machining.

One important advantage of the transport system of the invention is that it can be used not only for machining units but also at other transfer points, such as node points; this considerably reduces the time for transferring one workpiece carrier from one conveyor way to another, while preserving the flexibility of the transport system.

Another advantage is considered to be that the speed profile for conveying the workpiece carriers can be set arbitrarily, since it is not created by a disk cam gear but rather by an electronic control unit, such as a frequency inverter. Thus speed profiles adapted to various situations can be set. For instance, in a given situation as a workpiece carrier is being discharged from a node point, a first speed can be approached initially and then this speed is maintained over a relatively long distance. Upon approach to a separator, the speed can be reduced, so that the workpiece carrier arrives at the separator virtually without any impact. A machining unit can follow shortly downstream of the separator. For this shorter distance, the workpiece carrier will then be transported at a further speed profile adapted to the distance.

Compared with the prior art, neither disk cam gears nor brakes are present, so that the attendant costs are also saved.

Since the length of the conveyor way does not depend on segment length, it can be designed highly variably.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the schematic drawings.

DESCRIPTION OF THE EXEMPLARY EMBODIMENT

Figure 1:
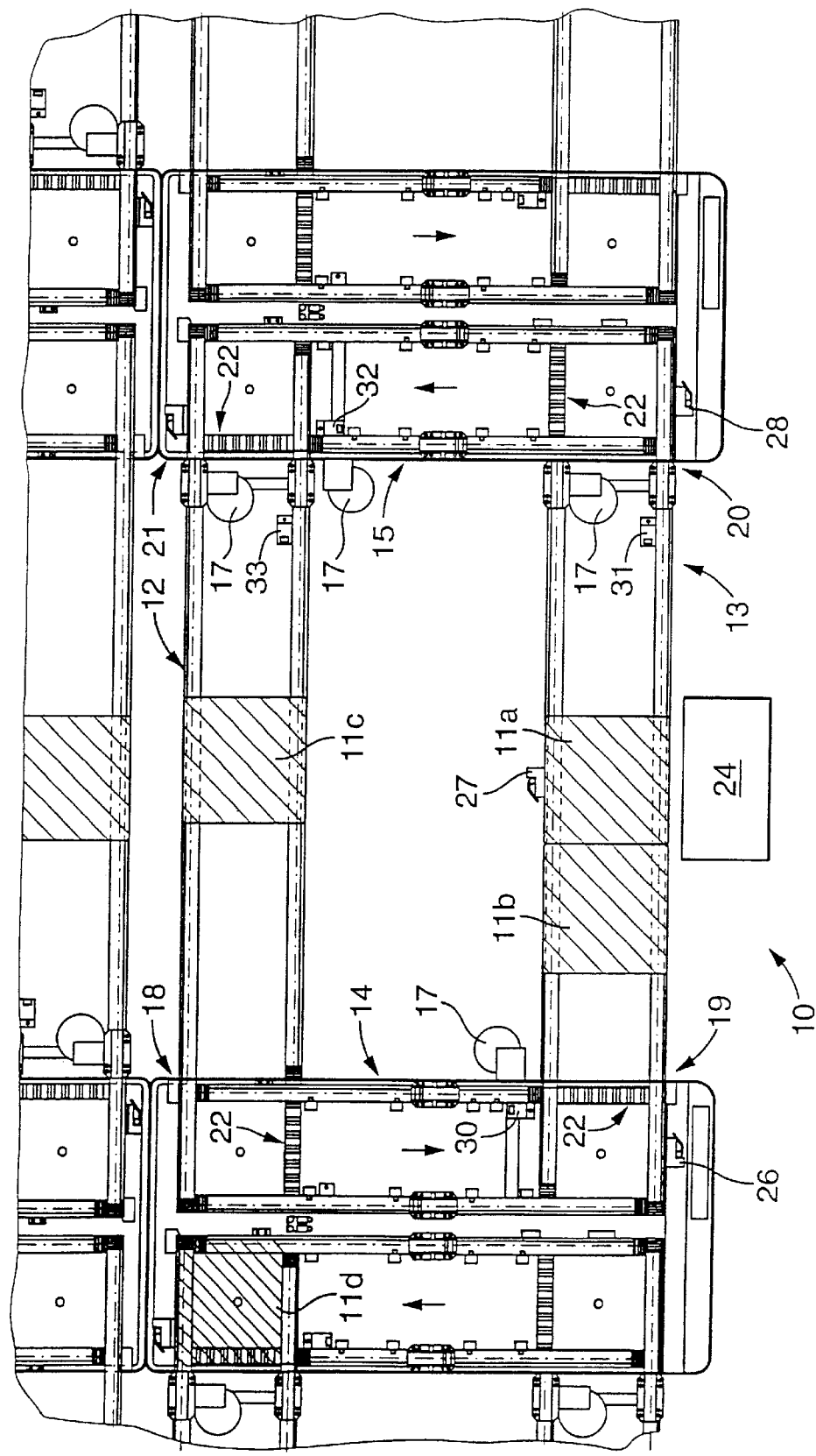
FIG. 1 shows the transport system in a plan view in the form of a detail of a transfer system.

FIG. 1 shows a transport system 10 for conveying articles to be conveyed, in particular workpiece carriers 11. A parallel conveyor way 13 is disposed at a distance from and parallel to a main conveyor way 12. Both the main conveyor way 12 and the parallel conveyor way 13 have the same direction of conveyance. They are connected to a feeder conveyor way 14 and a discharge conveyor way 15, which are disposed perpendicular to the main conveyor way 12 and the parallel conveyor way 13. They have contrary conveying directions. Each conveyor way 12–15 has its own conveyor means drive mechanism 17, comprising a rotary current motor and a worm gear. All the conveyor ways 12–15 are double belt conveyors, whose construction and mode of operation are known in general. One transverse transporting unit 22 is disposed at each of the node points 18–21, which are the various areas of overlap of the conveyor ways 12–15. The transverse transporting unit transports workpiece carriers 11 from one conveyor way to another. A machining unit 24 for machining, checking or mounting tasks is located in the region of the parallel conveyor way 13. The node points 18–21 and the machining unit 24 represent transfer points, at which workpiece carriers are transferred from one conveyor way to another, from one conveyor way to the machining unit, or from the machining unit to a conveyor way. A plurality of transport systems can be combined into a flexible transfer system, on which successively component units can be assembled from individual parts, for example, and checked. To that end, a plurality of transport systems 10 with the corresponding machining units 24 are lined up with one another at the node points 18 and 22. Disposed along the parallel conveyor way 13 are a first signal transducer 26 at the node point 19, a second signal transducer 27 at the machining unit 24, and a third signal transducer 28 at the node point 20. A respective separator 30 and 31 is disposed upstream of the node points 19 and 20. Upstream of the node point 22, a separator 32 is mounted on the discharge conveyor way 15 and a separator 33 is mounted on the main conveyor way 12. Separators are used to stop workpiece carriers. To that end, a separator has a stopping device that can be extended and retracted. For finding out whether a workpiece carrier is stopped at a separator or is passing it, a signal transducer is integrated with the separator.

Figure 2:
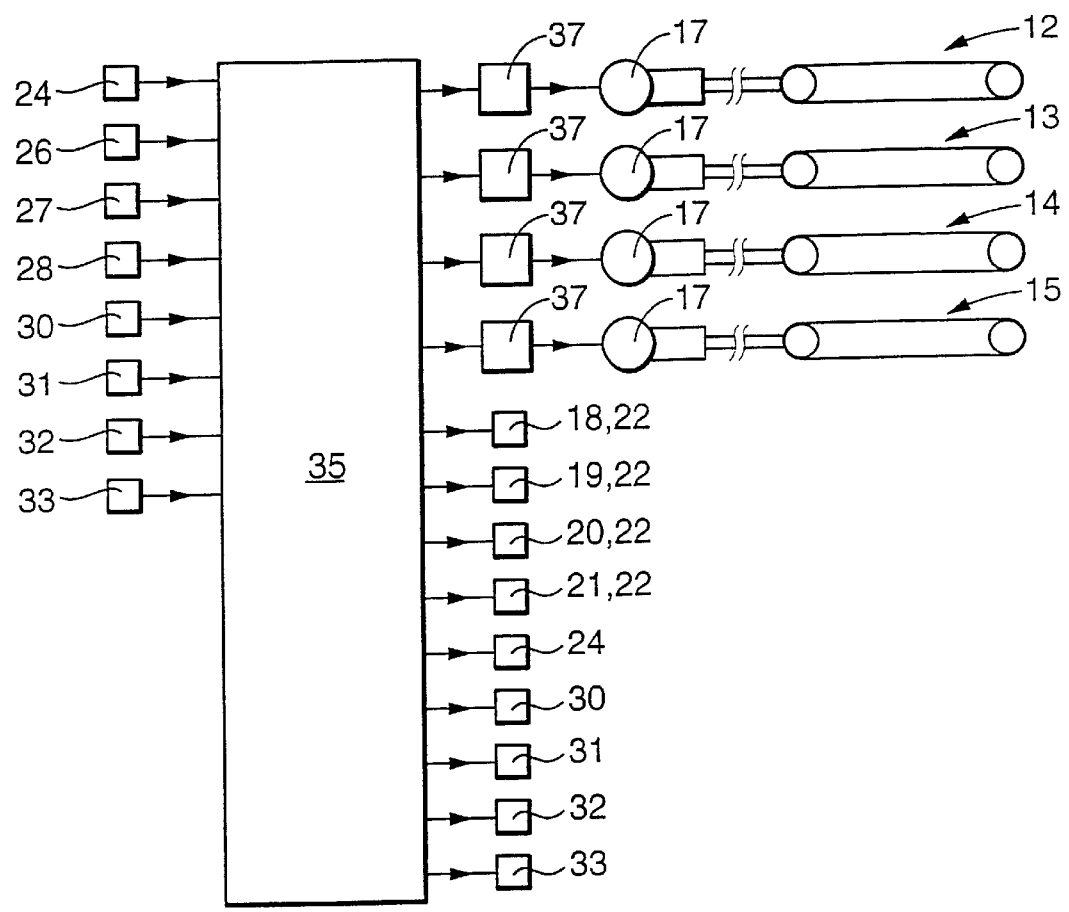
FIG. 2 shows a simplified connection plan of the transport system.

In FIG. 2, the signal transducers 26–28, the signal transducers integrated with the separators 30–33, and the machining unit 24 are connected to the inputs of a memory-programmable controller 35, hereinafter called the SPS 35. Four frequency inverters 37 are connected to the outputs of the SPS 35 and are connected to the rotary current motors of the conveyor means drive mechanisms 17 of the conveyor ways 12–15. The transverse transporting units 22 of the node points 18–21, the machining unit 24, and the stopping devices of the separators 30–33 are also all connected to the outputs of the SPS 35. The SPS 35 thus controls the entire transport system 10.

One SPS has a plurality of inputs and outputs for input and output signals, respectively. With a program stored in the memory there, which program as a rule comprises AND or OR linkages, input signals are processed, optionally with a time lag, into output signals.

Figure 3A:
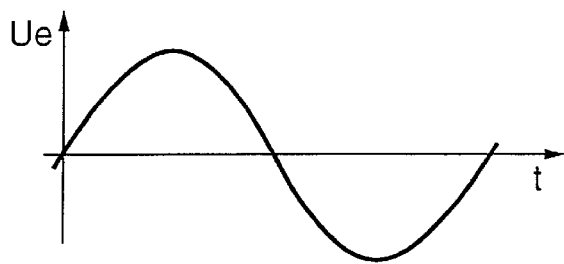
FIGS. 3a–3c shows the course of the voltages U occurring in a frequency inverter over the time t.
Figure 3B:
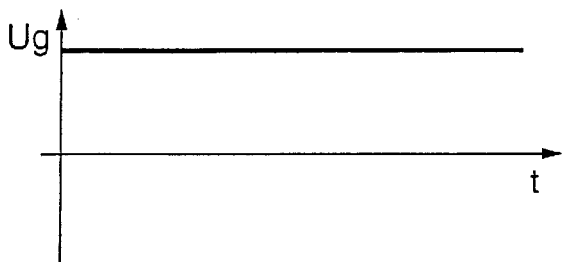
Figure 3C:
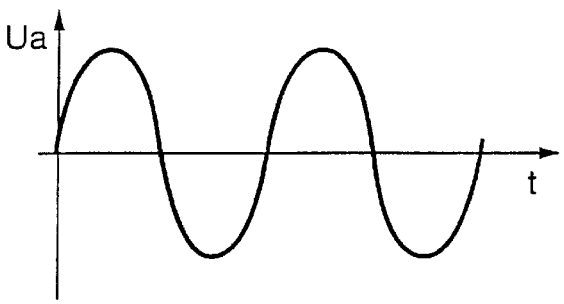

FIGS. 3a–3c show the mode of operation of a frequency inverter in terms of a single-phase alternating voltage. An input voltage $U_e$, for instance from the power supply grid, is converted into a direct voltage $U_g$ and then into an output voltage $U_a$ of adjustable frequency. The corresponding steps are shown in FIGS. 3a–3c in the form of the course of the respective voltage over the time t. With the output voltage $U_a$, a corresponding electric motor can be operated in speed-controlled fashion. For the rotary current power grid with three phases, the same principle applies, except that a rotary current motor is connected. The frequency of the output voltage $U_a$ can be adjusted manually or for instance with the aid of an SPS. Increasing or lowering the frequency can be done abruptly or gradually.

Figure 4A:
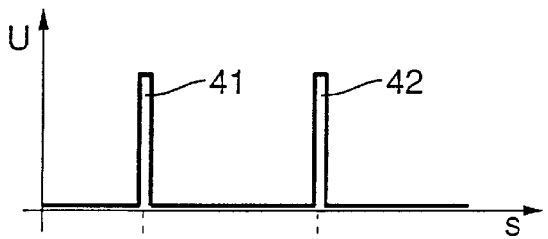
FIG. 4a shows signals of signal transducers over the distance s.
Figure 4B:
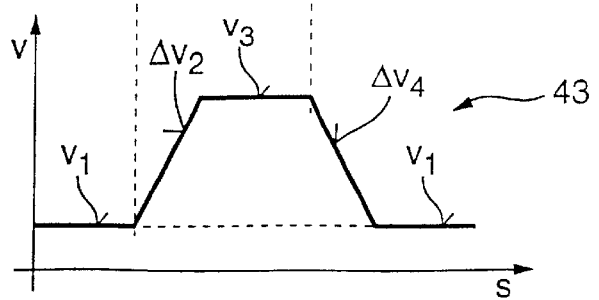
FIG. 4b shows the speeds v and delta v of a speed profile over the distance s.

FIG. 4a shows two signals 41 and 42 in a voltage and distance graph. In FIG. 4b, a speed profile 43 is shown with its individual speeds v in a speed and distance diagram. At first, the speed is equivalent to a basic speed $v_1$. Initially, the speed is equivalent to a basic speed $v_1$ of 12 m/min. The speed then rises along a slope delta $v_2$ to a value $V_3$ of 42 m/min. After that, the speed drops again along a slope delta $V_4$ to the basic speed $v_1$. The individual speeds v correspond to the speeds of the conveyor ways 12–15. The conveyor ways 12–15 are driven by the conveyor means drive mechanisms 17, which in turn are controlled by the frequency inverters 37. The speeds v are thus proportional to the frequencies generated by the frequency inverters. The slopes delta $v_2$ and delta $V_4$ are therefore also proportional to the increases or decreases in the frequency of the frequency inverters 37. The slopes delta $v_2$ and delta $v_4$ are tripped by the signals 41 and 42. The signals 41 and 42 are generated by the SPS 35. The mode of operation of the transport system 10 of the invention will now be explained with the aid of FIGS. 1, 4a and 4b. A workpiece carrier 11a is for instance present at the machining unit 24. A workpiece carrier 11b is located directly behind it. After the end of machining, the parallel conveyor way 13 transports the workpiece carrier 11a onward and transports the workpiece carrier 11b to the machining unit 24. During the time needed for replacing the workpiece carrier 11a at the machining unit 24 with the workpiece carrier 11b, hereinafter also called the changing time, no machining takes place. At the basic speed $v_1$ of 12 m/min and at a workpiece carrier length of 320 mm, the changing time amounts to at least 1.6 seconds, since the workpiece carrier 11b is waiting directly behind the workpiece carrier 11a. If correspondingly a node point is being traversed, the changing time is twice as long, or in other words 3.2 seconds, because of the longitudinal and transverse motions of the workpiece carriers 11a and 11b. In order now to reduce this time and to circumvent the disadvantages discussed in conjunction with the prior art, the sequence is as follows. The SPS 35 is informed of the end of machining by the machining unit 24. The basic speed $v_1$ of the parallel conveyor way 13 is then increased continuously, at the rate delta $v_2$, to the speed $v_3$ by the signal 41 of the SPS 35. Once the workpiece carrier 11a reaches the signal transducer 27, this signal transducer outputs the signal to the SPS 35. The SPS trips the signal 42, which causes the speed $v_3$ to be braked continuously at the rate delta $v_4$ to the basic speed $v_1$. The workpiece carrier 11b arrives at the machining unit 24 without bouncing. This makes it possible to save approximately 0.9 seconds of the 1.6 seconds in the change of workpiece carriers, which amounts to a time savings of approximately 56%.

Once the workpiece carrier 11b has reached the position at the machining unit 24, the higher speed $v_3$ can be tripped by the SPS 35 again, until such time as the workpiece carrier 11a reaches the signal transducer of the separator 31. The parallel conveyor way is then braked, for instance with a time lag, so that the workpiece carrier 11a enters the node point 20 without bouncing. Delayed braking is possible because the speed $v_3$ of the parallel conveyor way 13 and the distance to be traveled in the node point 20 are known and thus the value for delta $v_4$ can be calculated. The transverse transporting unit 22 of the node point 20 is now activated by the SPS 35, and the workpiece carrier 11a is moved onto the discharge conveyor way 15. The discharge conveyor way is then accelerated to the high speed $v_3$. A node can thus be traversed in 1.4 seconds, instead of 3.2 seconds. Once the signal transducer of the separator 32 arrives upstream of the node point 21, the discharge conveyor way 15 is braked in delayed fashion in such a way that the workpiece carrier 11a—again without bouncing—enters the node point 21. After that, the workpiece carrier 11a leaves the transport system 10. Since a further workpiece carrier 11c is transported to the node point 21 along the main conveyor way 12, the separator 33 is mounted upstream of the node point 21 in order to prevent a collision along the main conveyor way 12. In the case assumed here, no further workpiece carrier lid has yet directly followed the parallel conveyor way 13 when the machining of the workpiece carrier 11b begins. During ongoing machining, however, this workpiece carrier lid can catch up, since the feeder conveyor way 14 and in particular the parallel conveyor way 13 are never at a stop. If the machining has not yet been reported as being ended, the feeder conveyor way 14 and parallel conveyor way 13 can be operated at the higher speed $v_3$, so that the workpiece carrier lid can be conveyed with the least possible loss of time and yet still without bouncing through the node points 18 and 19 to the machining unit 24. By means of the signal transducer of the separator 30, the feeder conveyor way 14 is suitably braked once the workpiece carrier lid arrives at the node point 19. By means of the signal transducer 26, the speed of the parallel conveyor way 13 is then accelerated and then braked again by the signal transducer 27.

For the transport system 10 of the invention, the material comprising the belts and workpieces should have a high coefficient of friction. For the belt material, this can for instance be achieved by means of uncoated belt material. The slopes delta $v_2$ and delta $v_4$ must be set such that the workpiece carriers 11 are conveyed with as much freedom from slip as possible on the conveyor ways 12–14. Corresponding values for the slopes can be ascertained empirically.

Instead of bringing the speed of a conveyor way from a basic value to a higher value, it would also be conceivable for the speed from it's basic value to assume a lower value and then to return in that case to the higher value.

The use of an SPS is indeed usual in transport systems, since an SPS is simple to reprogram. The transport system can thus be adjusted to different tasks, such as assembly or checking. However, the signal transducers could also be connected directly to the frequency inverters, if the transport system is intended for only a single task.

As the conveyor means drive mechanism 17, it would also be conceivable, instead of a rotary current motor with a worm gear, to use an electric or hydraulic servo drive.

What is claimed is:

1. A transport system for feeding and/or discharging at least one workpiece carrier at at least one transfer point, comprising at least one conveyor means; at least one drive mechanism assigned to each of said conveyor means and driving the later; at least one electronic control unit provided for at least one drive mechanism and generating at least one speed profile which begins at a basic value other than zero, assumes at least one other value, and then resumes the basic value, so that said at least one conveyor means constantly convey workpiece carriers, said at least one conveyor means having at least one signal transducer whose signals act on said at least one control unit, so that the speed profile is tripped when a workpiece carrier reaches said signal transducer or a position at a machining unit, or when a machining unit reports an end of machining.

2. A transport system as defined in claim 1, wherein said at least one transfer point is an element selected from the group consisting of a machining unit and a node point.

3. A transport system as defined in claim 1, wherein said at least one drive mechanism is an electric motor.

4. A transport system as defined in claim 3, wherein said electric motor is a rotary current motor.

5. A transport system as defined in claim 1, wherein said at least one control unit is a frequency inverter.

6. A transport system as defined in claim 4, wherein said at least conveyor means is a belt conveyor.

7. A transport system as defined in claim 1, wherein said at least one conveyor means is a belt conveyor; and further comprising a gear located between said rotary current motor and said belt conveyor.

8. A transport system as defined in claim 1; and further comprising at least one memory-programmable controller connected between said signal transducer and said control unit.

9. A transport system as defined in claim 1, wherein said at least one drive mechanism is an electric drive mechanism.

10. A transport system as defined in claim 1, wherein at least one drive mechanism is a hydraulic servo drive mechanism.

11. A transport system for feeding and/or discharging at least one workpiece carrier at at least one transfer point, comprising at least one conveyor means; at least one drive mechanism assigned to each of said conveyor means and driving the later; at least one electronic control unit provided for at least one drive mechanism and generating at least one speed profile which begins at a basic value other than zero, assumes at least one other value, and then resumes the basic value, so that said at least one conveyor means constantly convey workpiece carriers, said at least one conveyor means having at least one signal transducer whose signals act on said at least one control unit, so that the speed profile is tripped when a workpiece carrier reaches said signal transducer or a position at a machining unit, or when a machining unit reports an end of machining, said conveying means including a feeder conveyor way, a parallel conveyor way arranged so that said feeder conveyor way is disposed in a conveying direction upstream of said parallel conveyor way, a discharge conveyor way disposed downstream of said parallel conveyor way in the conveying direction, a main conveyor way arranged so that said parallel conveyor way is disposed parallel to said main conveyor way, said discharge conveyor way and said feeder conveyor way transversely adjoining said main conveyor way; and further comprising a transporting unit arranged at each node point, said transverse transporting unit carrying a workpiece carrier at a right angle and maintaining its orientation from one conveyor way to another.

* * * * *